United States Patent
Simmer et al.

(10) Patent No.: US 11,285,395 B2
(45) Date of Patent: *Mar. 29, 2022

(54) GPU AUTHENTICATION

(71) Applicant: Zynga Inc., San Francisco, CA (US)

(72) Inventors: Jarred Wesley Simmer, San Francisco, CA (US); Jason Eugene Orcutt, San Bruno, CA (US); Samuel Sintz, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/863,624

(22) Filed: Apr. 30, 2020

(65) Prior Publication Data
US 2020/0324207 A1 Oct. 15, 2020

Related U.S. Application Data

(63) Continuation of application No. 16/033,052, filed on Jul. 11, 2018, now Pat. No. 10,668,383.

(51) Int. Cl.
*A63F 13/71* (2014.01)
*G06T 15/00* (2011.01)
*H04L 9/32* (2006.01)
*G06F 21/44* (2013.01)
*A63F 13/73* (2014.01)

(52) U.S. Cl.
CPC ............. *A63F 13/71* (2014.09); *A63F 13/73* (2014.09); *G06F 21/44* (2013.01); *G06T 15/005* (2013.01); *H04L 9/3236* (2013.01)

(58) Field of Classification Search
USPC .......................................... 463/29
See application file for complete search history.

(56) References Cited

U.S. PATENT DOCUMENTS

| | | | |
|---|---|---|---|
| 8,295,617 B2* | 10/2012 | Collins | H04N 19/176 382/232 |
| 9,213,825 B1* | 12/2015 | Gysin | G06F 21/35 |
| 10,668,383 B2* | 6/2020 | Simmer | G06F 21/44 |
| 10,939,295 B1* | 3/2021 | Avetisov | H04L 9/3247 |
| 2009/0285496 A1* | 11/2009 | Collins | H04N 19/507 382/232 |

(Continued)

OTHER PUBLICATIONS

"U.S. Appl. No. 16/033,052, Non Final Office Action dated Nov. 7, 2019", 7 pgs.

(Continued)

*Primary Examiner* — Pierre E Elisca
(74) *Attorney, Agent, or Firm* — Schwegman Lundberg & Woessner, P.A.

(57) ABSTRACT

In example embodiments, a method of limiting access to a gaming system is disclosed. Encoded content is embedded into an image presented by an application executing on a client device. The image is captured into an image buffer. The encoded content is retrieved from the image. A login request is sent to the gaming system. The login request includes the encoded content. A login response is received from the gaming system. The login response includes a success status. The success status is based on a verification of the encoded content. A notification of the success status is presented in a user interface on the client device.

20 Claims, 8 Drawing Sheets

(56) References Cited

U.S. PATENT DOCUMENTS

| | | | |
|---|---|---|---|
| 2012/0064976 A1* | 3/2012 | Gault | A63F 13/77 463/42 |
| 2014/0096215 A1* | 4/2014 | Hessler | H04W 12/06 726/7 |
| 2016/0101355 A1* | 4/2016 | Pereira | A63F 13/35 463/31 |
| 2017/0329955 A1* | 11/2017 | Hessler | H04W 12/062 |
| 2020/0016494 A1 | 1/2020 | Simmer et al. | |
| 2020/0197800 A1* | 6/2020 | Gault | H04N 21/4781 |

OTHER PUBLICATIONS

"U.S. Appl. No. 16/033,052, Notice of Allowance dated Jan. 23, 2020", 10 pgs.

"U.S. Appl. No. 16/033,052, Response filed Nov. 14, 2019 to Non-Final Office Action dated Nov. 7, 2019", 8 pgs.

\* cited by examiner

GPU AUTHENTICATION

This application is a continuation of U.S. patent application Ser. No. 16/033,052, filed Jul. 11, 2018, now issued as U.S. Pat. No. 10,668,383, which is incorporated herein by reference in its entirety.

TECHNICAL FIELD

The present disclosure generally relates to user authentication in computer networks and, in one specific example, to using information pertaining to a graphical processing unit (GPU) of a client device to control access to a gaming server.

BACKGROUND

A game networking system may manage the creation and exchange of virtual goods pertaining to games executing on the game networking system. Such virtual goods may be deposited into gaming accounts of players when the players perform various actions, such as achieving particular objectives within a game, sharing information about a game with friends on social media, or inviting other people to play a game. Such actions may be game-play-related actions or non-game-play-related actions. For example, in Zynga Poker, a player may win poker chips by winning a bet within a poker game or by winning a Lucky Bonus payout (e.g., by playing a separate Lucky Bonus slots game that is accessible by the player from within a Zynga Poker client).

Additionally, players may acquire virtual goods by paying real money for the virtual goods. For example, a player of Zynga Poker may purchase virtual poker chips using real money. Even if such virtual goods cannot be exchanged for real money, they may have a real money value—either because they were purchased by real money by a player or because of the time a player invested in performing the necessary actions to obtain the virtual goods.

"Headless clients" (e.g., clients that connect to a game but don't graphically render aspects of the game) may be run en masse on one or more machines for purposes of virtual good (e.g., chip) farming. Such clients may simply ping authentication and feature endpoints (e.g., to obtain virtual currency, which may then be dumped or otherwise redistributed among accounts). Such farming may devalue virtual goods, reduce revenues of the operator of the game networking system, reduce enjoyment of the players of the games executing on the game networking system, or disrupt business prediction models of the operator of the game networking system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In example embodiments, a method of limiting access to a gaming system to client devices that graphically render a game is disclosed. Encoded content is embedded into an image presented by an application (e.g., the game) executing on a client device. The image is captured into an image buffer. The encoded content is retrieved from the image. A login request is sent to the gaming system. The login request includes the encoded content. A login response is received from the gaming system. The login response includes a success status. The success status is based on a verification of the encoded content. A notification of the success status is presented in a user interface on the client device.

Consider a game, such as Zynga poker, that may be susceptible to chip farming. In order to reduce chip exploitation, an operator of such a game may desire to prevent, or at least make it more difficult, for a single machine to run a large number of poker clients at once.

One solution is to run a hashing algorithm (e.g., SHA-2) inside a custom shader that hashes data that is needed for a login to be verified. In order for that shader to run, the client would need access to a GPU of the client device. While this extra hurdle is not impossible to get around, it will add friction to running multiple instances of Poker for anyone that may be running headless units. In example embodiments, the shader will hash a unique device identifier with a salt, and encode the hash into a texture as colors. As used herein, a shader is a computer program that is coded for a GPU on the client device to perform functions pertaining to rendering of graphics on the GPU, including shading (e.g., producing appropriate levels of light, darkness, and color within an image), special effects, video post-processing, and other functions.

Figure 1:
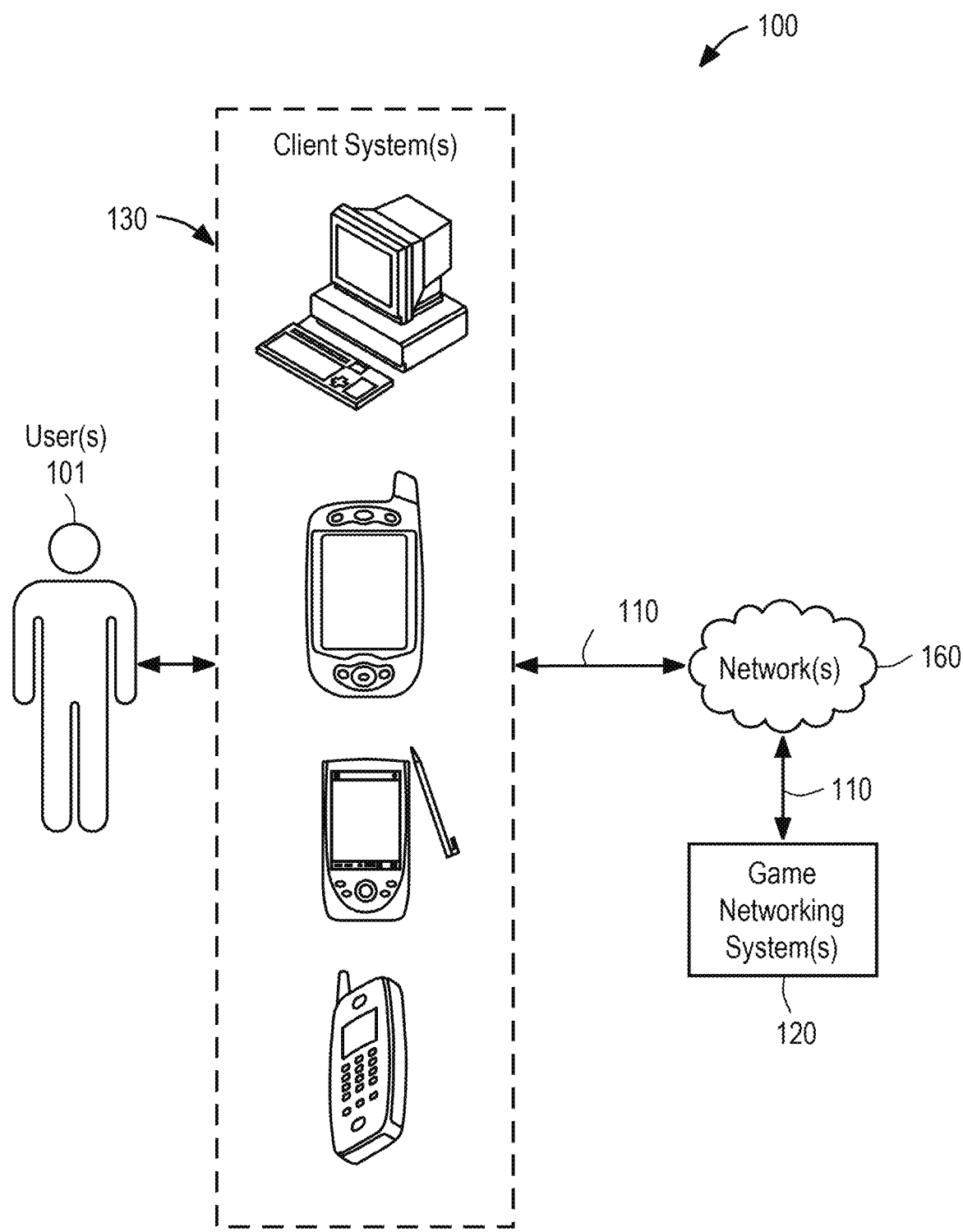
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises user(s) 101, game networking system(s) 120, client system(s) 130, and network(s) 160. The one or more users(s) 101 may also be referred to as one or more player(s); and the player(s) may also be referred to as the user(s) 101. The components of system 100 can be connected to each other in any suitable configuration, using any suitable type of connection. The components may be connected directly or over network(s) 160, which may be any suitable network. For example, one or more portions of network(s) 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Game networking system(s) 120 is a network-addressable computing system that can host one or more online games. Game networking system(s) 120 can generate, store, receive, and transmit game-related data, such as, for example, game account data, game input, game state data, and game displays. Game networking system(s) 120 can be accessed by the other components of system 100 either directly or via network(s) 160. Players (e.g., user(s) 101) may use client system(s) 130 to access, send data to, and receive data from game networking system(s) 120. Client system(s) 130 can access game networking system(s) 120 directly, via network 160, or via a third-party system. Client system(s) 130 can be any suitable computing device, such as a personal computer, laptop, cellular phone, smart phone, computing tablet, and the like.

Although FIG. 1 illustrates a particular number of user(s) 101, game networking system(s) 120, client system(s) 130, and network(s) 160, this disclosure contemplates any suitable number of users 101, game networking systems 120, client systems 130, and networks 160. Although FIG. 1 illustrates a particular arrangement of user(s) 101, game networking system(s) 120, client system(s) 130, and network(s) 160, this disclosure contemplates any suitable arrangement of user(s) 101, game networking system(s) 120, client system(s) 130, and network(s) 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between user(s) 101, game networking system(s) 120, client system(s) 130, and network(s) 160, this disclosure contemplates any suitable connections between user(s) 101, game networking system(s) 120, client system(s) 130, and network(s) 160. As an example and not by way of limitation, in particular embodiments, client system(s) 130 may have a direct connection to game networking system(s) 120, thereby bypassing network(s) 160.

Online Games and Game Systems
Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player (e.g., user 101) controls one or more player characters (PCs). The game engine controls all other aspects of the game, including NPCs and in-game objects. The game engine also manages game state, including player character state for currently active (e.g., online) and inactive (e.g., offline) players.

An online game can be hosted by game networking system(s) 120, which can be accessed using any suitable connection with a suitable client system(s) 130. A player may have a game account on game networking system(s) 120, wherein the game account can contain a variety of information associated with the player (e.g., the player's personal information, financial information, purchase history, player character state, game state, etc.). In some embodiments, a player may play multiple games on game networking system(s) 120, which may maintain a single game account for the player with respect to all the games, or multiple individual game accounts for each game with respect to the player. In some embodiments, game networking system(s) 120 can assign a unique identifier to each user 101 of an online game hosted on game networking system(s) 120. Game networking system(s) 120 can determine that a user 101 is accessing the online game by reading the user's 101 cookies, which may be appended to Hypertext Transfer Protocol (HTTP) requests transmitted by client system(s) 130, and/or by the user 101 logging onto the online game.

In particular embodiments, user(s) 101 may access an online game and control the game's progress via client system(s) 130 (e.g., by inputting commands to the game at the client device). Client system(s) 130 can display the game interface, receive inputs from user(s) 101, transmit user inputs or other events to the game engine, and receive instructions from the game engine. The game engine can be executed on any suitable system (such as, for example, client system(s) 130, or game networking system(s) 120). As an example and not by way of limitation, client system(s) 130 can download client components of an online game, which are executed locally, while a remote game server, such as game networking system(s) 120, provides backend support for the client components and may be responsible for maintaining application data of the game, processing the inputs from the player, updating and/or synchronizing the game state based on the game logic and each input from the player, and transmitting instructions to client system(s) 130. As another example and not by way of limitation, each time a player (e.g., a user 101) provides an input to the game through the client system(s) 130 (such as, for example, by typing on the keyboard or clicking the mouse of client system(s) 130), the client components of the game may transmit the player's input to game networking system(s) 120.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, user(s) 101 may access particular game instances of an online game. A game instance is a copy of a specific game play area that is created during runtime. In particular embodiments, a game instance is a discrete game play area where one or more user(s) 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more user(s) 101 and one or more in-game objects controlled by the game engine. When accessing an online game, the game engine may allow user(s) 101 to select a particular game instance to play from a plurality of game instances. Alternatively, the game engine may automatically select the game instance that user(s) 101 will access. In particular embodiments, an online game comprises only one game instance that all user(s) 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and another user are directly connected (one edge), they are deemed to be separated by one degree of separation. The other user would be a so-called "first-degree friend" of the player. Where the player and the other user are connected through one other user (two edges), they are deemed to be separated by two degrees of separation. The other user would be a so-called "second-degree friend" of the player. Where the player and the other user are connected through N edges (or N–1 other users), they are deemed to be separated by N degrees of separation. The other user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, game networking system(s) 120). In one embodiment, Nmax equals 1, such that the player's social network includes only first-degree friends. In another embodiment, Nmax is unlimited and the player's social network is coextensive with the social graph.

In particular embodiments, the social graph is managed by game networking system(s) 120, which is managed by the game operator. In other embodiments, the social graph is part of a social networking system managed by a third-party (e.g., Facebook or Snapchat). In yet other embodiments, user 101 has a social network on both game networking system(s) 120 and a social networking system, wherein user(s) 101 can have a social network on the game networking system(s) 120 that is a subset, superset, or independent of the user's 101 social network on the social networking system. In such combined systems, game networking system(s) 120 can maintain social graph information with edge type attributes that indicate whether a given friend is an "in-game friend," an "out-of-game friend," or both. The various embodiments disclosed herein are operable when the social graph is managed by the social networking system, game networking system(s) 120, or both.

Figure 2:
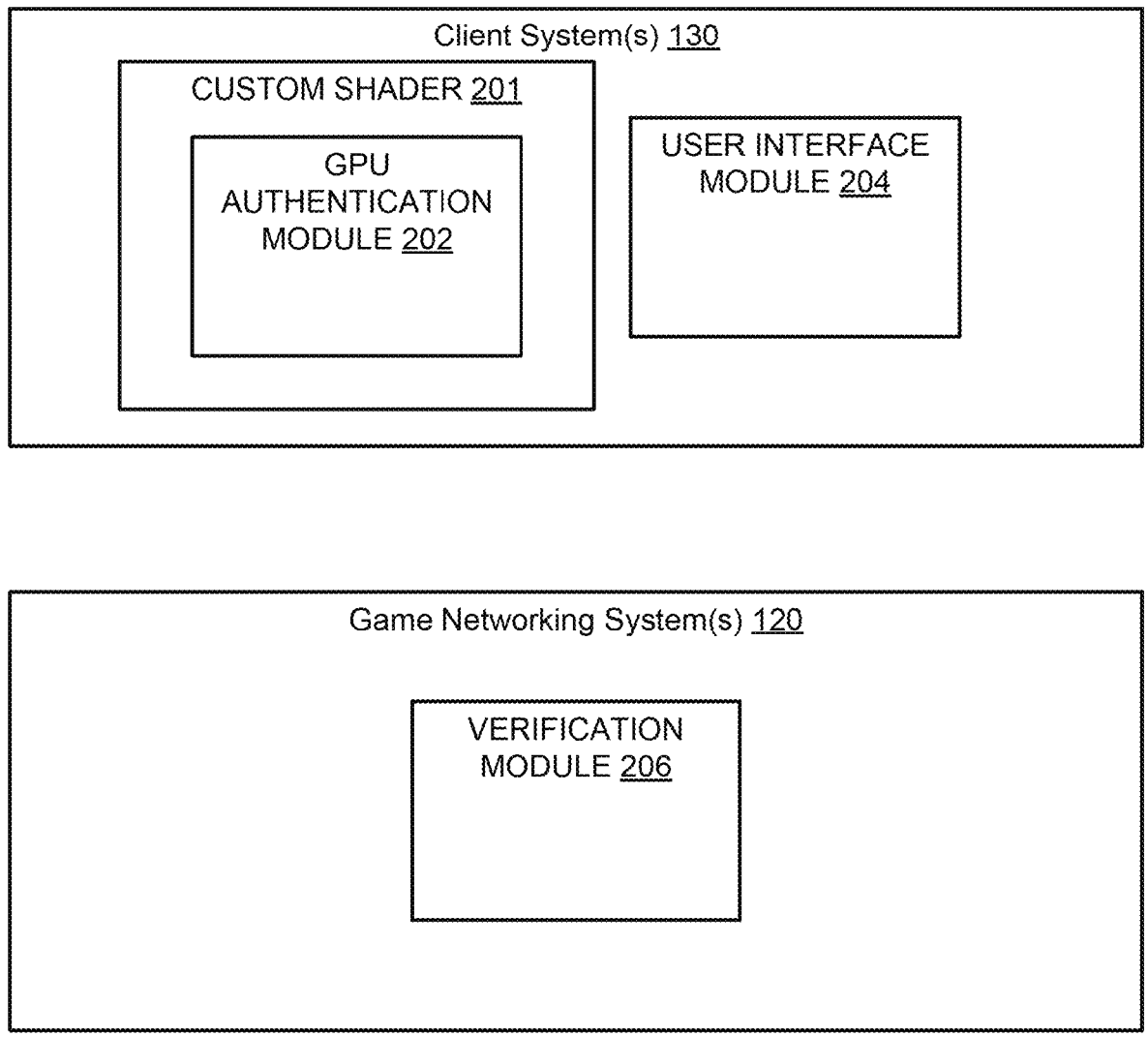
FIG. 2 is a block diagram illustrating example modules of the game networking system of FIG. 1.

FIG. 2 is a block diagram illustrating example modules of the client system(s) 130 and the game networking system(s) 120. In example embodiments, the client system(s) 130 include a custom shader 201, a GPU authentication module 202, and a user interface module 204. The GPU authentication module 202 is configured to perform operations for using a GPU of a client device to verify that an application executing on a client device is not a headless application. For example, the GPU authentication module may be configured to generate encoded content, embed the encoded content into an image associated with an application, capture the image, retrieve the encoded content from the image, and communicate the encoded content to a gaming system for verification, as described in more detail below. The user interface module 204 is configured to present notifications pertaining to the acceptance by the game networking system of a connection from the client device to the game networking system.

In example embodiments, the game networking system(s) 120 include includes a verification module 206 to provide access to game networking system based on a verification that encoded content received from a client device (e.g., in a login request) is authentic. For example, the verification module 206 may generate a hash value based using a same algorithm and input values used by the GPU authentication module and then compare the hash value with an additional hash value received from the client device, as described in more detail below. The verification module may provide a success status in a response to the login request.

GPU Authentication

Figure 3:
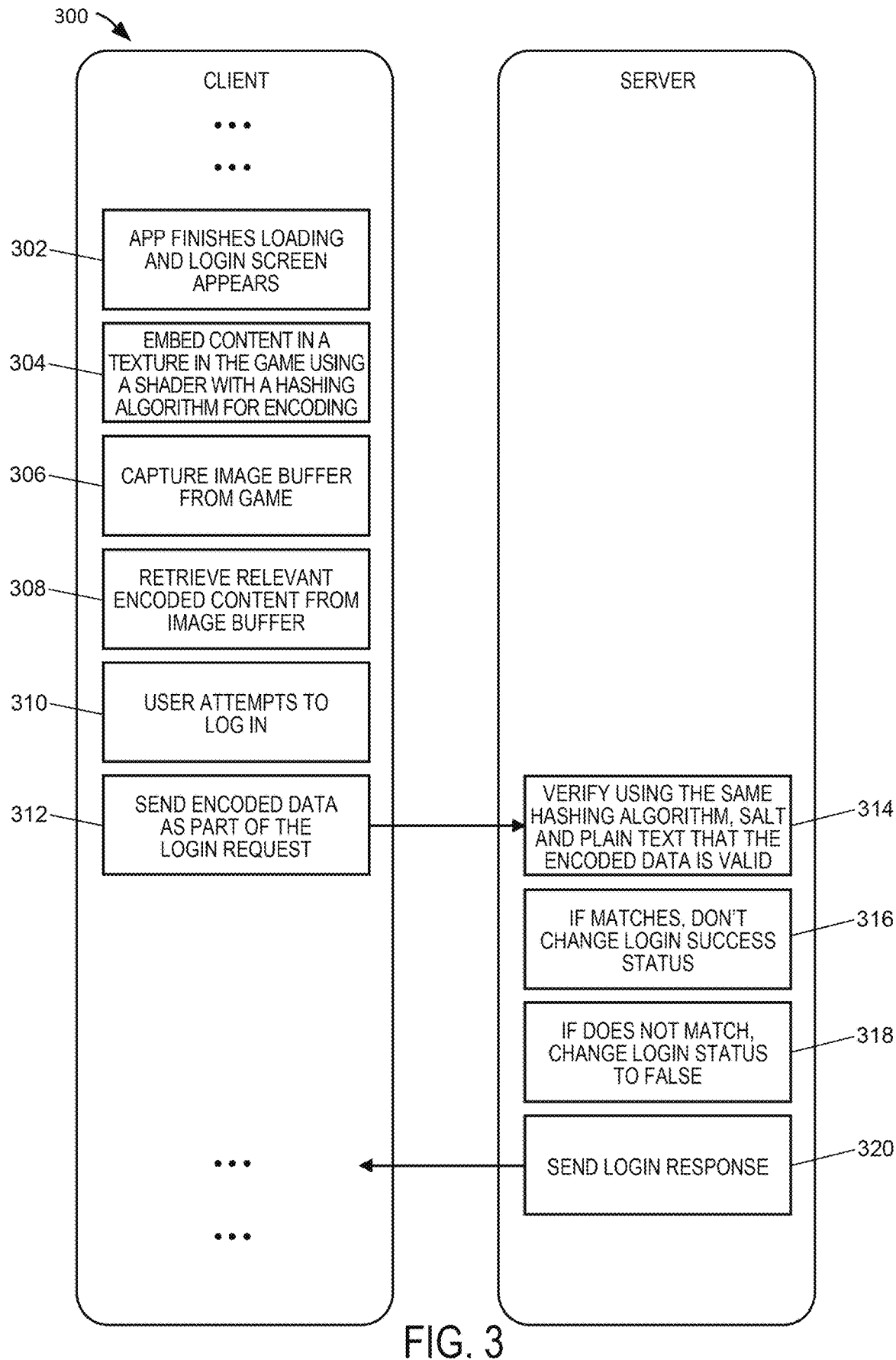
FIG. 3. is a block diagram of an example method of limiting access to a game networking system based on GPU authentication.

FIG. 3 is a block diagram of an example method 300 of using GPU authentication to limit client access to a gaming server. In various embodiments, the method 300 may be performed by one or more modules of the game networking system(s) 120 and the client system(s) 130.

At operation 302, an application (e.g., a game) executing on a client device finishes loading and presents a login screen to a user of the client device. In example embodiments, the login screen user interface includes one or more images rendered by a shader executing on the client device. In example embodiments, the one or more images may be images rendered off screen by the shader.

At operation 304, encoded content is embedded into one of the images. For example, the encoded content is generated using a hashing algorithm. The hashing algorithm, such as the SHA-2 algorithm, may take a unique identifier (e.g., a device identifier that uniquely identifies the device) as a first input and a salt as a second input. Here, the salt may be a cryptographic salt comprising random data (e.g., that is generated or known by the game networking system). The resulting hash may serve as the encoded content. The encoded content may be embedded in the image (e.g., as colors of a texture of the image).

The salt may be predetermined, calculated-on-the-fly using an algorithm that is based on data known simultaneously by the client and the game networking server, or communicated to the client device in a separate communication from the game networking system. Additionally, the salt may change over time based on predetermined factors, including changes to the known data, such that the salt is in synchronization between the client device and the game networking system for purposes of performing the GPU authentication.

At operation 306, the image is captured into an image buffer.

At operation 308, the embedded encoded content is retrieved from the image in the image buffer.

At operation 310, a user of the client device attempts to login to the game networking system.

At operation 312, the encoded content is sent to the game networking system as part of a login request.

At operation 314, in response to the receiving of the login request, the game networking system attempts to verify the encoded content. For example, the game networking system runs the hashing algorithm on the unique identifier and the salt to generate an additional hash value. This additionally-generated hash value is then compared with the hash value received from the client device.

At operation 316, if the hash value generated by the game networking system matches the hash value generated by and received from the client device, the login success status is set to true.

At operation 318, if the hash value generated by the game networking system does not match the hash value generated by and received from the client device, the login success status is set to false.

At operation 320, a login response is sent in response to the login request. The login request includes the login success status value. Additionally, the client may be granted access to the game networking system based on the login success value.

Figure 4:
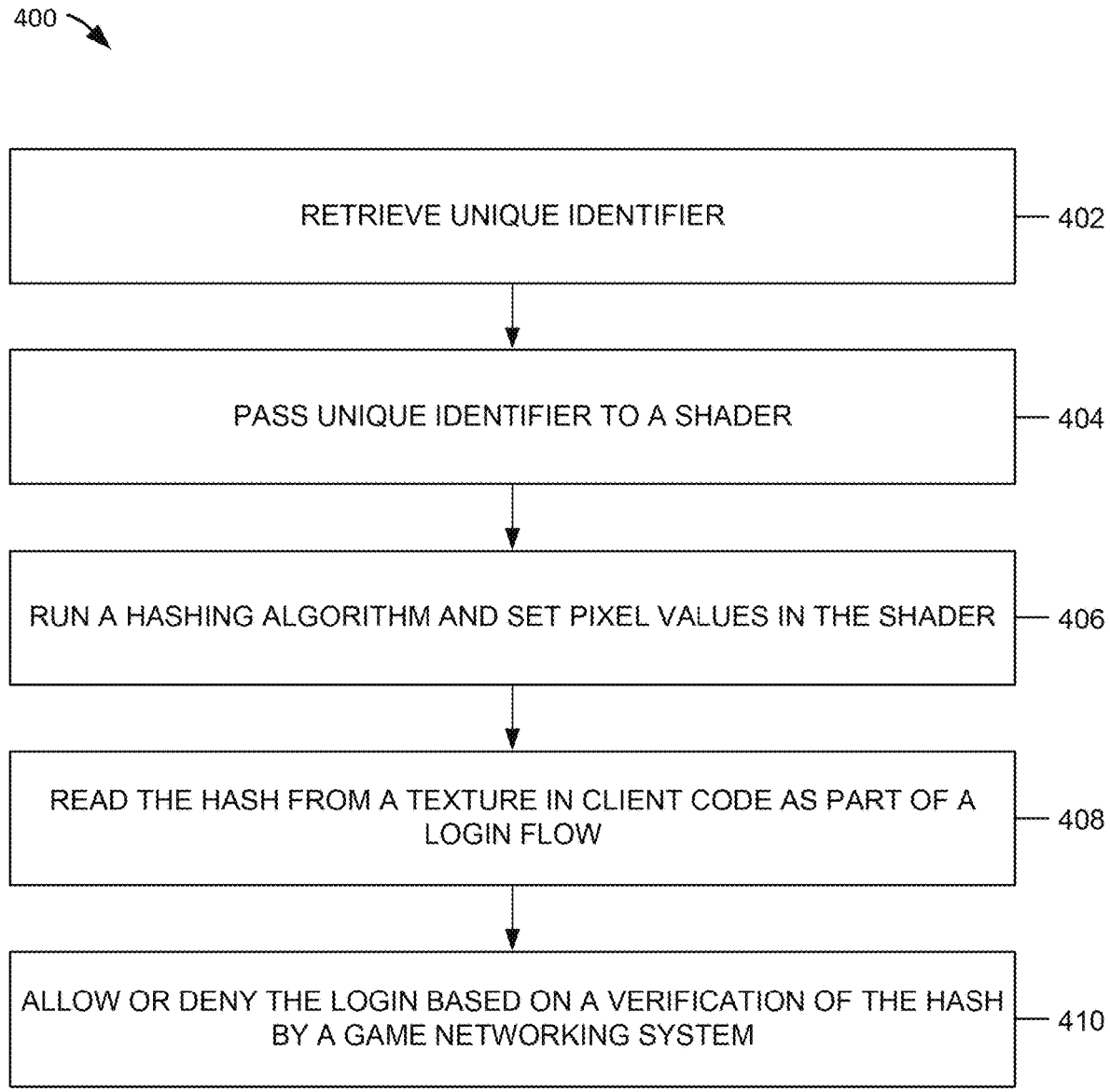
FIG. 4. is a block diagram of an additional example method of limiting access to a game networking system based on GPU authentication.

FIG. 4 is a block diagram of an example method 400 of using GPU authentication to limit client access to a gaming server. In various embodiments, the method 300 may be performed one or more modules of the game networking system(s) 120 and the client system(s) 130.

At operation 402, a unique identifier is retrieved. In example embodiments, the unique identifier is a unique identifier of a client device executing an application that is seeking to connect to the game networking system.

At operation 404, the unique identifier is passed to a custom shader. In example embodiments, depending on the types of data that an underlying game development platform supports for passing to a shader, it may not be possible to pass a buffer to the shader in a shader model required by target platforms. In this case, instead of passing the data as a string, the data may be encoded into a texture (e.g., in C#) and passed as a texture to the shader. This approach is better for passing large amounts of data to a shader and allows for simple lookups. Alternatively, a string may be stored as an array (e.g., of Vector4s in C#) and passed to the shader. This approach may be more straightforward to debug and can support unit tests. It may also have the potential to be easier to work with when hashing as all of the data is already in an array that the hashing algorithm may require as input.

At operation 406, a hashing (e.g., the SHA-2) algorithm executing inside the customs shader is run on the unique identifier and a salt, as described above. Additionally, pixel values representing the hash value are set in the shader, as discussed above.

At operation 408, the hash value is read from the pixel values before or during a login process, as discussed above.

At operation 410, the hash value is communicated to the game networking system for verification and for allowing or denying of the login, as discussed above. The application may present a notification of whether the login has been allowed or denied in a login user interface being presented on the client device.

Figure 5:
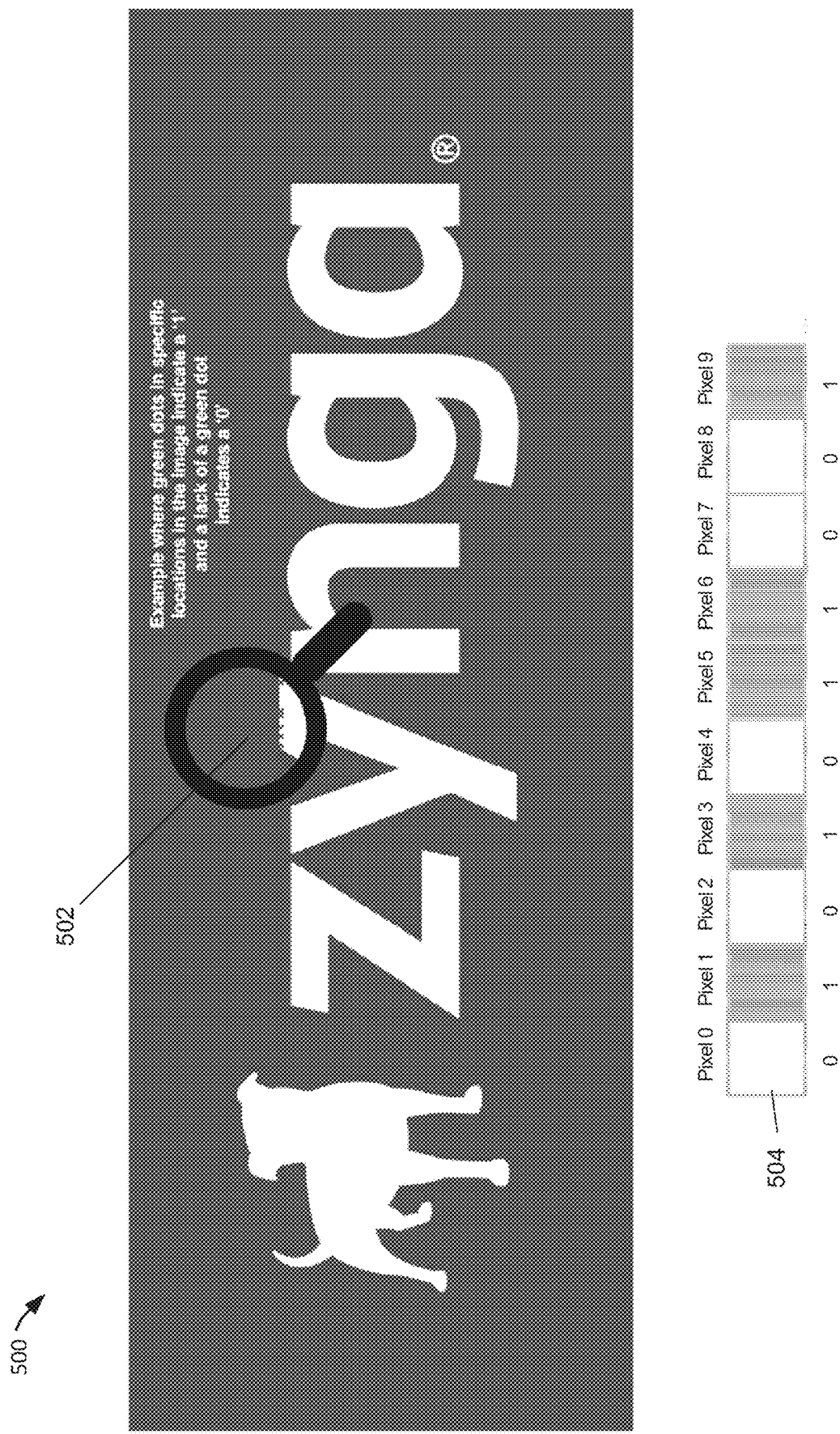
FIG. 5 is a screen shot of an example user interface in which a hash has been encoded as pixel values.

FIG. 5 is a screen shot of an example user interface 500 in which a hash has been encoded by a custom shader as pixel values, as discussed above. In this example, a specific (e.g., predefined) location of the user interface includes a series of green dots and white dots representing the pixel values. The green dots are interpreted as representing a value of "1" and the white dots are interpreted as representing a value of "0." The hash value may thus be from the pixel values included in a particular location of the user interface and communicated to the game networking system, as discussed above.

Data Flow

Figure 6:
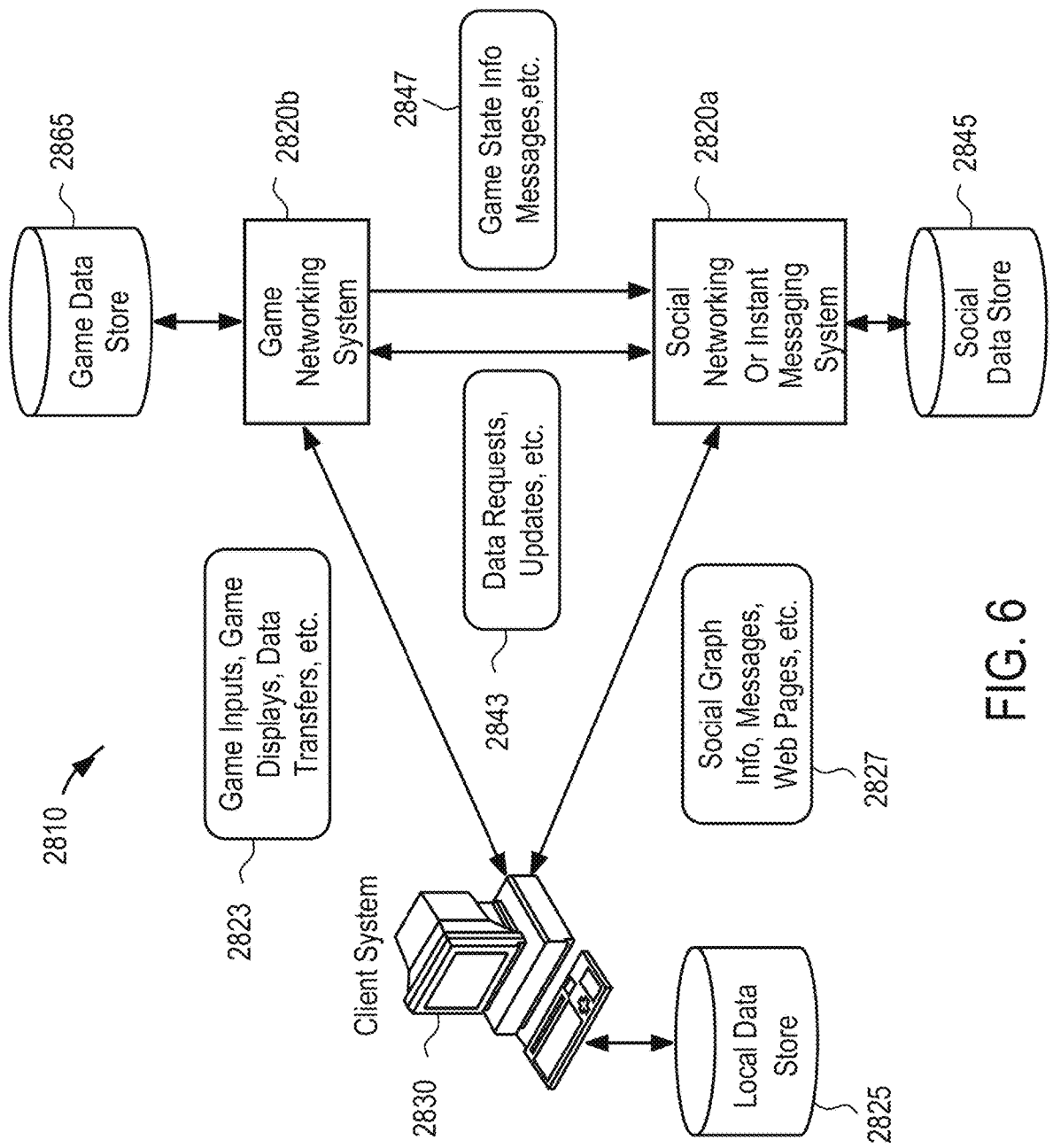
FIG. 6 is a block diagram illustrating an example data flow between the components of a system.

FIG. 6 is a block diagram illustrating an example data flow between the components of system 2810. In particular embodiments, system 2810 can include client system 2830, social networking system 2820a, and game networking system 2820b. The components of system 2810 can be connected to each other in any suitable configuration, using any suitable type of connection. The components may be connected directly or over any suitable network. Client system 2830, social networking system 2820a, and game networking system 2820b can each have one or more corresponding data stores such as local data store 2825, social data store 2845, and game data store 2865, respectively. Social networking system 2820a and game networking system 2820b can also have one or more servers that can communicate with client system 2830 over an appropriate network. Social networking system 2820a and game networking system 2820b can have, for example, one or more internet servers for communicating with client system 2830 via the Internet. Similarly, social networking system 2820a and game networking system 2820b can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820b. This data can include, for example, webpages, messages, game inputs, game displays, HTTP packets, data requests, transaction information, updates, and other suitable data. At some other time, or at the same time, game networking system 2820b can communicate data 2843, 2847 (e.g., game state information, game system account information, page info, messages, data requests, updates, etc.) with other networking systems, such as social networking system 2820a (e.g., Facebook, Myspace, etc.). Client system 2830 can also receive and transmit data 2827 to and from social networking system 2820a. This data can include, for example, webpages, messages, social graph information, social network displays, HTTP packets, data requests, transaction information, updates, and other suitable data.

Communication between client system 2830, social networking system 2820a, and game networking system 2820b can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols may be used). In addition, a server in one interaction context may be a client in another interaction context. In particular embodiments, the information transmitted between hosts may be formatted as HTML documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820b, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820b. Game networking system 2820b may itself operate by retrieving a copy of the BLOB from a database or an intermediate memory cache (memcache) layer. Game networking system 2820*b* can also de-serialize the BLOB to resolve the game state parameters and execute its own game logic based on the events in the batch file of events transmitted by the client to synchronize the game state on the server side. Game networking system 2820*b* may then re-serialize the game state, now modified, into a BLOB and pass this to a memory cache layer for lazy updates to a persistent database.

With a client-server environment in which the online games may run, one server system, such as game networking system 2820*b*, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820*b* for further processing. In addition, multiple client systems 2830 may transmit other types of application data to game networking system 2820*b*.

In particular embodiments, a computer-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820*a* or game networking system 2820*b*), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 2820*a* or game networking system 2820*b*). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820*b*. However, to expedite the processing and hence the speed of the overall gaming experience, the Flash client may collect a batch of some number of events or updates into a batch file. The number of events or updates may be determined by the Flash client dynamically or determined by game networking system 2820*b* based on server loads or other factors. For example, client system 2830 may send a batch file to game networking system 2820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820b may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820b may retrieve the corresponding BLOB from the database to determine the most-recent values of the game-related data. In particular embodiments, while a player is playing the online game, game networking system 2820b may also load the corresponding BLOB into a memory cache so that the game networking system 120 may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network-addressable resource or web site. Additionally, as used herein, a user may be an individual, a group, or an entity (such as a business or third-party application).

Figure 7:
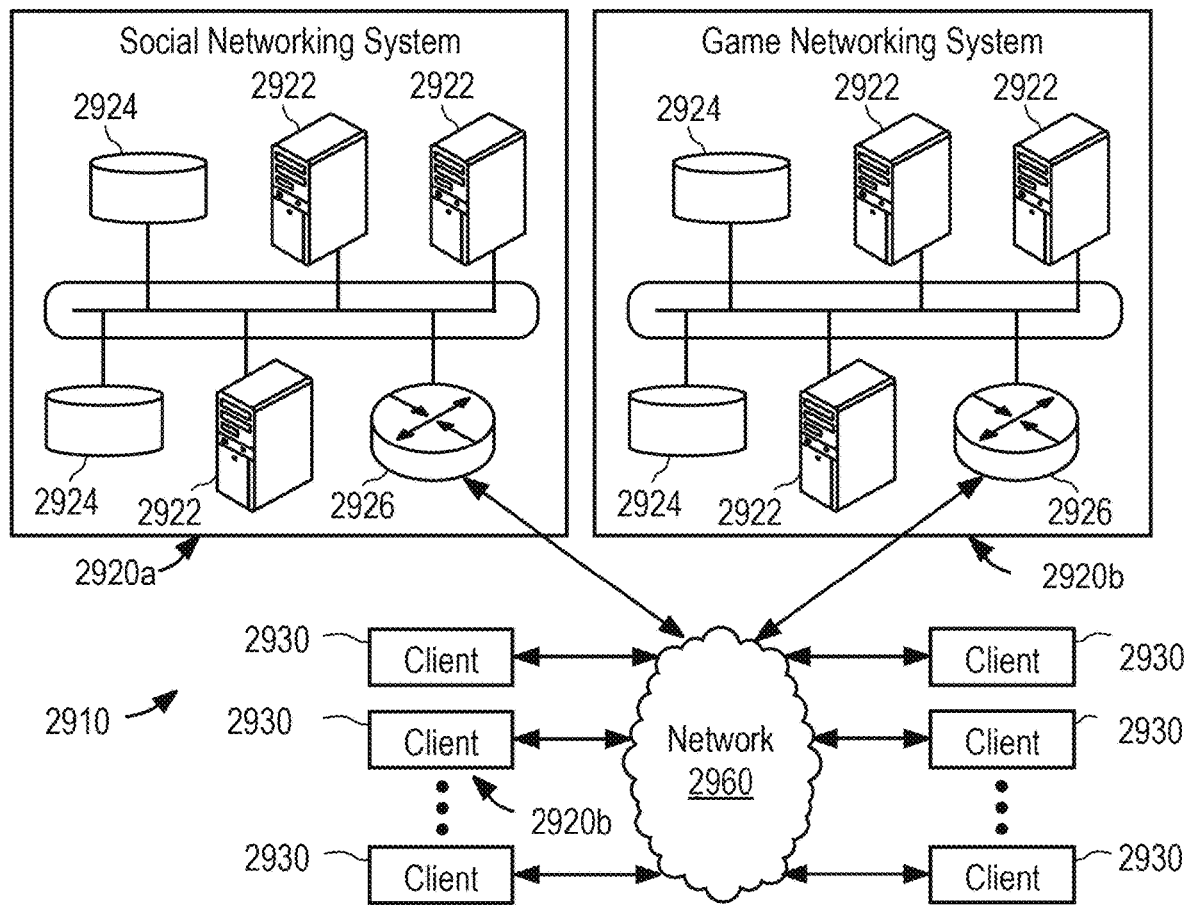
FIG. 7 is a block diagram illustrating an example network environment in which various example embodiments may operate.

Particular embodiments may operate in a wide area network environment, such as the Internet, including multiple network-addressable systems. FIG. 7 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 7 illustrates, particular embodiments may operate in a network environment comprising one or more networking systems, such as social networking system 2920a, game networking system 2920b, and one or more client systems 2930. The components of social networking system 2920a and game networking system 2920b operate analogously; as such, hereinafter they may be referred to simply as networking system 2920. Client systems 2930 are operably connected to the network environment 2910 via a network service provider, a wireless carrier, or any other suitable means.

Networking system 2920 is a network-addressable system that, in various example embodiments, comprises one or more physical servers 2922 and data stores 2924. The one or more physical servers 2922 are operably connected to computer network 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client system 2930. The request may also include location information identifying a geographic location of the user's client system or a logical network location of the user's client system. The request may also include a timestamp identifying when the request was transmitted.

Although the example network environment 2910 described above and illustrated in FIG. 7 is described with respect to social networking system 2920a and game networking system 2920b, this disclosure encompasses any suitable network environment using any suitable systems. As an example and not by way of limitation, the network environment may include online media systems, online reviewing systems, online search engines, online advertising systems, or any combination of two or more such systems.

Figure 8:
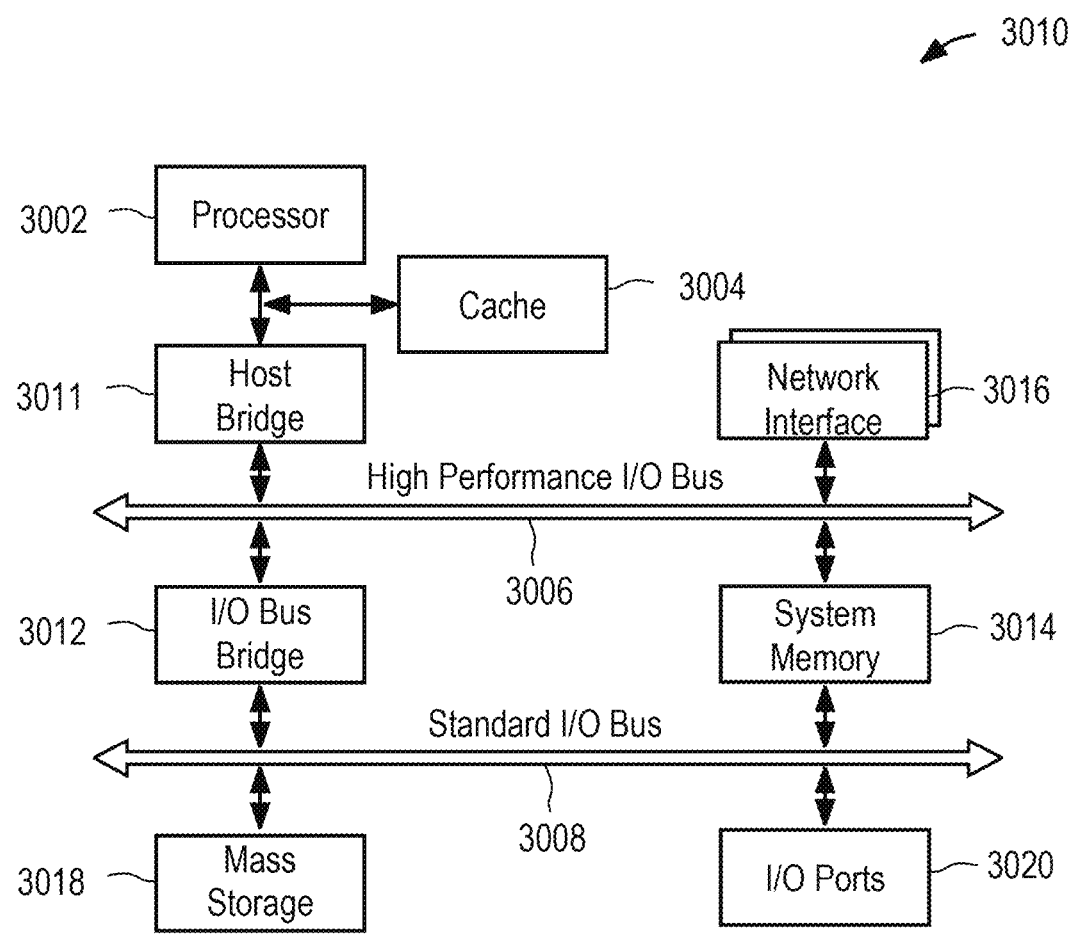
FIG. 8 is a block diagram illustrating an example computing system architecture that may be used to implement a server or a client system.

FIG. 8 is a block diagram illustrating an example computing system architecture, which may be used to implement a server 2922 or a client system 2930 (FIG. 7). In one embodiment, hardware system 3010 comprises a processor 3002, a cache memory 3004, and one or more executable modules and drivers, stored on a tangible computer-readable medium, directed to the functions or methodologies described herein. Additionally, hardware system 3010 may include a high performance input/output (I/O) bus 3006 and a standard I/O bus 3008. A host bridge 3011 may couple processor 3002 to high performance I/O bus 3006, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures, and various components of hardware system 3010 may be rearranged. For example, cache memory 3004 may be on-chip with processor 3002. Alternatively, cache memory 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to other games. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising:
one or more computer processors;
one or more computer memories;
a set of instructions incorporated into the one or more computer memories, the set of instructions configuring the one or more computer processors to perform operations for limiting access to a gaming system, the operations comprising:
determining that a client attempting to access a game on the gaming system is configured to graphically render the game, the determining based on receipt of data indicating that the client accessed a shader executing on the client device during the attempting of the access; and
based on the determining that the client attempting to access the game is configured to graphically render the game, providing the client with access to the gaming system.

2. The system of claim 1, further comprising embedding encoded content into an image for presentation on the client and wherein the determining that the client is configured to graphically render the game is based on a determination from the data that the client retrieved the encoded content from the image.

3. The system of claim 2, wherein the encoded content is represented as colors of a texture of the image.

4. The system of claim 2, wherein the image is included in a login-in screen associated with the game.

5. The system of claim 2, wherein the data is generated by running a hashing algorithm on the client that takes the embedded content as a first input.

6. The system of claim 5, wherein the hashing algorithm takes a salt as a second input, the salt being in synchronization between the gaming system and the client.

7. The system of claim 1, wherein the data is generated by running a hashing algorithm inside the shader.

8. A method comprising:
performing operations, using one or more processors of a gaming system, for limiting access to the gaming system, the operations comprising:
determining that a client attempting to access a game on the gaming system is configured to graphically render the game, the determining based on receipt of data indicating that the client accessed a shader executing on the client device during the attempting of the access; and
based on the determining that the client attempting to access the game is configured to graphically render the game, providing the client with access to the gaining system.

9. The method of claim 8, further comprising embedding encoded content into an image for presentation on the client and wherein the determining that the client is configured to graphically render the game is based on a determination from the data that the client retrieved the encoded content from the image.

10. The method of claim 9, wherein the encoded content is represented as colors of a texture of the image.

11. The method of claim 9, wherein the image is included in a login-in screen associated with the game.

12. The method of claim 9, wherein the data is generated by running a hashing algorithm on the client that takes the embedded content as a first input.

13. The method of claim 12, wherein the hashing algorithm takes a salt as a second input, the salt being in synchronization between the gaming system and the client.

14. The method of claim 8, wherein the data is generated by running a hashing algorithm inside the shader.

15. A non-transitory computer-readable medium comprising a set of instructions that, when executed by one or more computer processors, cause the one or more computer processors to perform operations for limiting access to a gaming system, the operations comprising:
determining that a client attempting to access a game on the gaming system is configured to graphically render the game, the determining based on receipt of data indicating that the client accessed a shader executing on the client device during the attempting of the access; and
based on the determining that the client attempting to access the game is configured to graphically render the game, providing the client with access to the gaming system.

16. The non-transitory computer-readable medium of claim 15, further comprising embedding encoded content into an image for presentation on the client and wherein the determining that the client is configured to graphically render the game is based on a determination from the data that the client retrieved the encoded content from the image.

17. The non-transitory computer-readable medium of claim 16, wherein the encoded content is represented as colors of a texture of the image.

18. The non-transitory computer-readable medium of claim 16, wherein the image is included in a login-in screen associated with the game.

19. The non-transitory computer-readable medium of claim 16, wherein the data is generated by running a hashing algorithm on the client that takes the embedded content as a first input.

20. The non-transitory computer-readable medium of claim 19, wherein the hashing algorithm takes a salt as a second input, the salt being in synchronization between the gaming system and the client.

\* \* \* \* \*